United States Patent [19]

Stewart, Sr.

[11] Patent Number: 4,792,307
[45] Date of Patent: Dec. 20, 1988

[54] ELECTRICAL CONTACT AND TERMINAL ASSEMBLY

[75] Inventor: Kenneth W. Stewart, Sr., Columbus, Miss.

[73] Assignee: United Technologies Electro Systems, Inc., Columbus, Miss.

[21] Appl. No.: 930,824

[22] Filed: Nov. 14, 1986

[51] Int. Cl.⁴ .............................. H01R 39/00
[52] U.S. Cl. ....................... 439/26; 439/595; 439/741; 439/720
[58] Field of Search ........... 439/595, 686, 687, 689, 439/691, 692–696, 701, 712, 713, 717, 720, 733, 22–26, 741–748, 751, 752, 869, 871–873

[56] References Cited

U.S. PATENT DOCUMENTS

| 2,495,206 | 1/1950 | Brus | 439/695 |
|---|---|---|---|
| 2,803,717 | 8/1957 | Sanda | 439/751 |
| 2,856,492 | 10/1958 | Heyhal | 200/166 |
| 4,352,535 | 10/1982 | McNamee, Sr. et al. | 339/75 |
| 4,380,119 | 4/1983 | Normann et al. | 29/884 |
| 4,398,135 | 8/1983 | Busch et al. | 318/443 |
| 4,400,051 | 8/1983 | Stenz | 439/744 |
| 4,547,964 | 10/1985 | Amano et al. | 29/883 |
| 4,548,461 | 10/1985 | John et al. | 339/217 |
| 4,557,542 | 12/1985 | Collet et al. | 339/59 |
| 4,572,979 | 2/1986 | Haar et al. | 310/68 |

FOREIGN PATENT DOCUMENTS

| 2046488 | 3/1972 | Fed. Rep. of Germany | 439/752 |
|---|---|---|---|
| 531393 | 9/1954 | France | 439/744 |

Primary Examiner—David Pirlot

[57] ABSTRACT

A contact and terminal assembly having a block member, a conductor, and a securing member is disclosed. The block member and the securing member each define coacting curved surfaces between which the conductor is secured. The coacting curved surfaces define an appropriate angle for bending the conductor such that the conductor may serve on one end as a contact and at the other end as a terminal to which an electrical connection may be made. The block member, conductor, and securing member each include appropriate tabs and shoulders such that the three items may be appropriately interlocked to be affixed to each other.

14 Claims, 2 Drawing Sheets

FIG. 3A
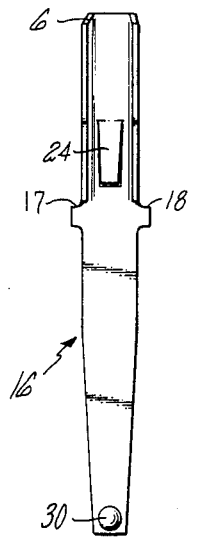
FIG. 3C
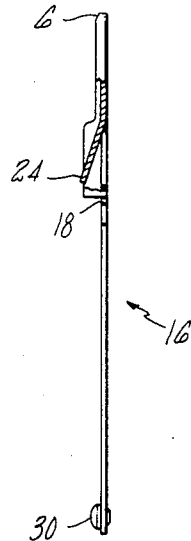
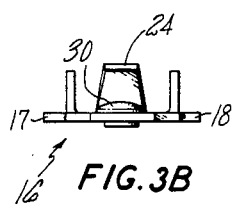
FIG. 3B
FIG. 4
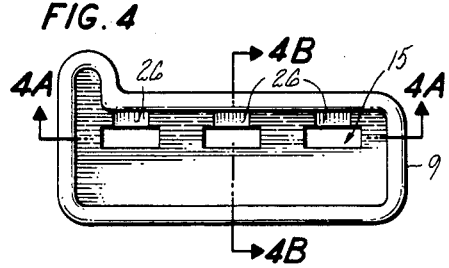
FIG. 4B
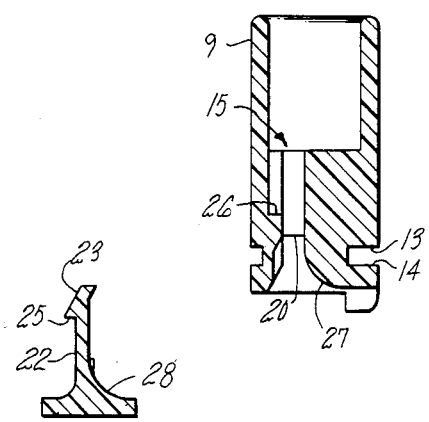
FIG. 5A
FIG. 4A
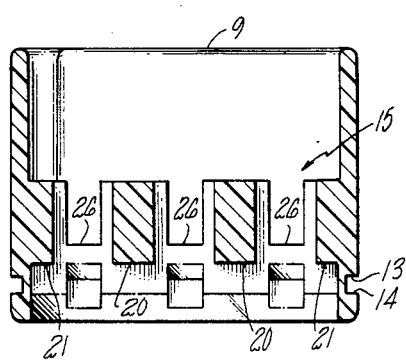
FIG. 5
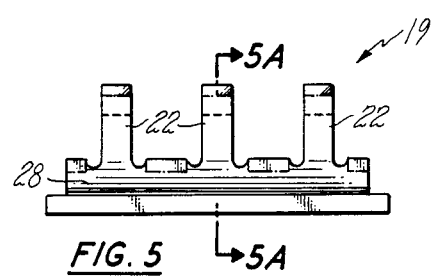

ELECTRICAL CONTACT AND TERMINAL ASSEMBLY

BACKGROUND OF THE INVENTION

This invention relates to an improved structure for an electrical contact and terminal assembly, particularly of the type that provides a means for supplying an electrical current path from an outside source to internal circuits of an electrical device such as an electric motor. The improved structure is particularly suited for applications wherein the contacts rest against a motor driven component having an electrical contact surface thereon, such as a gear, and whereby the operation of the motor is controlled by the position of the contacts with respect to the contact surface on the gear.

Contact and terminal assemblies, prior to this invention, have been structured such that the terminal and contact is fabricated from a conductive material, such as a spring tempered alloy, which is formed to a desired configuration and then molded into a block of plastic or nonconductive material. This assembly is then secured to the electrical device such that the terminals are available for connecting to an external source of power and provide a current path to contacts inside the device. A problem encountered with these prior structures is that after the terminal and contact is formed and then placed in a mold to produce an assembly, the formed terminal and contact is often inadvertently bent through handling or otherwise distorted during the molding operation.

Another method used to fabricate this type assembly prior to this invention is to fabricate the terminal and contacts as separate parts then to secure them together with a rivet or eyelet. These secured parts are then placed in and secured to a nonconductive block. The problem of damaging or bending the terminals and contacts still exists, and in addition, the connection between the terminal and the contact provided by the rivet is a potential source for high resistance or open condition for the circuit.

The present invention avoids these problems by providing a contact and terminal conductor that is formed as a generally flat, one piece member of a suitable conductive material that is then placed into a receiving cavity of a nonconductive block that has a curved surface formed within the side walls of the cavity which defines the desired angle of the contact after the assembly is completed. A securing member having a surface that corresponds to the curved surface provided in the side wall of the cavity is then inserted into the cavity. As the securing member is inserted into the cavity, the conductor is bent of formed to the angle as dictated by the angular position of the surfaces with respect to the side walls of the cavity. The securing member acts to cooperate with the terminal block in forming the conductor to a predetermined angular position, and to secure the conductor to the terminal block. An obvious advantage of the invention lies in the fact that the forming of the contact and terminal member is done as a last operation so that unwanted distortion and damage is avoided. Another improvement provided by the invention is to be found in the consistency from part to part of the angle formed. Still another advantage is to be found in the fact that the structure, in accordance with the invention, lends itself to a highly automatable part that is compatible with known robotic techniques of assembly.

SUMMARY OF THE INVENTION

It is an object of the present invention to provide a self-contained integral contact and terminal assembly which may be repetitively assembled with the contact always remaining in the desired position.

It is another object of the present invention to provide a contact and terminal assembly having a conductor which is deformed to be appropriately angled from the assembly to provide the desired level of contact pressure between the contact and the surface with which it is engaged.

A still further object of the present invention is to provide a contact and terminal assembly which is suitable for being assembled utilizing current robotic technologies.

It is a yet further object of the present invention to provide a contact and terminal assembly wherein upon assembly each of the parts are interlocking to secure the parts in the assembled position.

It is another object of the present invention to provide a safe, reliable, economical, and easy to manufacture contact and terminal assembly.

Other objects will be apparent from the description herein and the appended claims.

The above objects are achieved according to a preferred embodiment by the provision of a contact and terminal assembly which includes an insulative block member defining an area for the receipt of an electrical conductor and including a block member curved surface. A conductor is mounted within the area defined by the block member, said conductor having a terminal end and a contact end. A securing member having a curved surface is sized to coact with the block member curved surface such that the conductor may be secured therebetween and when secured, said conductor is configured to conform to at least one curved surface, and means for affixing the secured member to the insulative member to secure the conductor therebetween.

The contact and terminal assembly further includes the block member defining a shoulder and the conductor including a tab which may engage that shoulder to secure the tab in position and the securing member having a resilient finger which acts to displace the tab to engage the shoulder and which includes a stop section which likewise engages the shoulder such that the securing member and the conductor are both mated to the insulative block.

Also disclosed is a dynamoelectric machine of the type having an armature and a movable conductive surface that is driven by the armature along a predetermined path of travel. The machine includes a terminal and the contact assembly having terminals to which wires may be secured and contacts positioned to engage a movable conductive surface during at least a portion of the path of travel. The terminal and contact assembly includes an insulative block member defining a cavity and a block member curved surface, a resilient conductor having an end which serves as a terminal and another end which serves as a contact for electrically engaging the movable conductive surface, said resilient conductor being mounted within the insulated block member, and a securing member having a curved surface sized to coact with the curved surface of the block member to secure the conductor therebetween and to configure the resilient conductor such that the contact end of the resilient conductor is appropriately positioned to engage the movable conductive surface when the securing member is affixed to the block member.

Also disclosed is a method of assembly of a contact and terminal assembly wherein a conductor is secured between a block member having a block member curved surface, a central cavity and a block shoulder, wherein the securing member defines a securing member curved surface, an extending resilient finger in a stop section and wherein the conductor defines a tab portion. The steps include placing the conductor within the central cavity of the block member while leaving a portion of the conductor extending therefrom, and inserting the securing member into position to cause bending of the conductor to conform to the block member curved surface and the securing member curved surface, displacing of the conductor tab portion to effect engagement with the block shoulder and securing of the stop member to the block member by engagement of the stop section with the block shoulder.

BRIEF DESCRIPTION OF THE DRAWINGS

FIGS. 3-A, 3-B, 3-C, are a top view, end view and side view, respectively, of the conductor prior to assembly into the block.

FIG. 4 is an end view of the terminal block.

FIG. 4-A is a sectional view of the terminal block.

FIG. 4-B is another sectional view of the terminal block.

FIG. 5 is a top view of the securing member.

FIG. 5-A is a sectional view of the securing member.

DESCRIPTION OF THE PREFERRED EMBODIMENT

The invention will be described herein relative to small, fractional horsepower motors which have been designed to facilitate assembly including automated assembly. It is to be understood that this invention has like applicability to other types of electrical devices which utilize electrical contacts and terminal assemblies and to various sized devices and to devices which are manually assembled.

Figure 1:
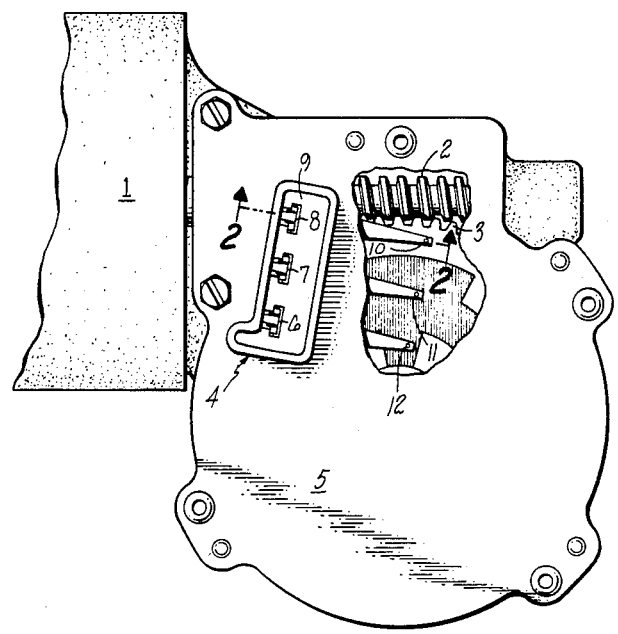
FIG. 1 is a partial cutaway view of a motor assembly showing a contact and terminal assembly in accordance with the invention.

Referring to FIG. 1, there is shown a dynamoelectric machine which is a motor having a housing 1 that encloses an armature. The armature includes shaft 2 which extends from the housing and has formed thereon a worm gear that meshes with the teeth on gear 3 so that as the armature rotates, the gear is driven in a conventional manner. Contact and terminal assembly 4, is shown secured to cover plate 5. Terminal ends 6, 7 and 8 are provided for connecting to electrical leads. These leads may extend to a power source and/or a manual control switch or to a control to indicate position or some other control aspect relating to the motor, all of which are shown. The terminal ends are dimensioned to be compatible with conventional mating terminals provided on the ends of the electrical leads.

Each of the terminals extend through block member 9 to the underside of cover plate 5 where each are formed and positioned to serve as a contact that rests upon gear 3 as indicated by points 10, 11 and 12. In the preferred arrangement, the terminals 6, 7 and 8 and contacts 10, 11 and 12 are each respectively formed from a suitable copper alloy having spring temper, although it is understood other materials could be used. Each of the terminals extends through a cavity defined by the block and then serves as a spring contact that rides against the gear. Each then, in the preferred form, is a continuous metal conductor.

Figure 2:
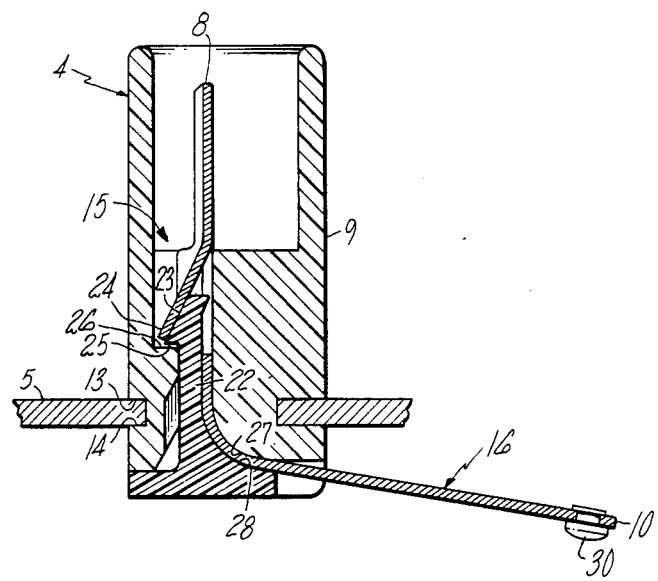
FIG. 2 is a sectional view of the contact and terminal assembly.

FIG. 2 is an enlarged sectional view of the contact and terminal assembly taken along section A—A of FIG. 1. The terminal block 9 is secured to cover plate 5 in a preferred manner by molding the block onto the plate. The plate is metal and is inserted into the mold that forms the block such that the molten plastic material of the block flows through and around the plate, thus forming lips 13 and 14, one on each side of the plate. The block is also formed to provide a cavity 15 for securing conductor 16, one end of which serves as terminal end 8 and the other end serves as spring contact arm 10.

FIGS. 3-A, 3-B, and 3-C show conductor 16 prior to its assembly into block 9. FIG. 3-A is a top view of the conductor. FIG. 3-B is a sectional view A—A taken across the terminal end of the conductor, and FIG. 3-C is a side view of conductor 16.

Conductor 16 includes terminal end 8 appropriately shaped to be mated with an appropriate female connector for making electrical connection therebetween. Formed from a portion of conductor 16 is tab 24. It is seen that tab 24 is angled downwardly from the main body of the conductor and there is an opening facing the contact end of the conductor such that, as will be later described, the finger of a securing member may be inserted therebetween to force the tab portion further away from the main body of the conductor. Shoulders 17 and 18 are shown extending outwardly from the conductor and are appropriately arranged to engage stops 20 and 21 in block member 9.

FIGS. 4, 4-A, 4-B are top and appropriate sectional views of the block member. FIG. 4 is the top view of the block member 9 with the appropriate central cavity being disclosed. In FIG. 4-A there may be seen cavity 15 as well as block member stops 20 and 21 and shoulder 26. The stops 20 and 21 are that portion of the block member that shoulders 17 and 18 of the conductor engage to prevent further insertion of the conductor into the block member. It is shoulder 26 to which extending tab portion 24 of the conductor and stop section 25 of the securing member are engaged. In FIG. 4-B, stop shoulder 26 may be more specifically seen as curved surface 27, lips 13, and 14, and cavity 15.

Referring now to FIGS. 5 and 5-A, specific details of the securing member are shown. Securing member 19 is shown having three extending fingers 22, each of which has an inclined end surface 23. Specifically referencing FIG. 5-A, there may be seen curved surface 28 which mates with curved surface 27 of the block member to configure the conductor therebetween. Additionally, finger 22 is shown having inclined end surface 23 and stop section 25. It is this stop section 25 that engages shoulder 26 of the block member to affix the securing member to the block member. End surface 23 is the surface inserted between the body portion of the conductor and tab 24 to further cause tab 24 to be deflected away from the body portion of the conductor such that it may engage shoulder 26 of the block member.

The preferred steps of assembly are to insert conductor 16 into block 9 from the right side as viewed in FIG. 2. The conductor moves to the left until shoulders 17 and 18 come to rest against stops 20 and 21 in block 9 as best viewed in FIG. 4-A. Securing member 19 as best viewed in FIGS. 5, 5-A and 5-B is then moved into, cavity 15 of the block from the right as viewed in FIG. 2. Finger 22 of the securing member enters the cavity under the conductor and, as movement to the left continues, the conductor is bent upward as viewed in FIG. 2. The extreme end 23 of the finger 22 forces tab 24 downward. As the securing member seats, a stop section 25 of the securing member drops over shoulder 26 of block 9. Thus, the block, the conductor and the securing member are locked together.

Also, as the securing member seats into the block, the conductor is bent to conform to the curved surface 27 of the block and curved surface 28 of the securing member. These surfaces may be altered to produce varying angular positions of the conductor 16 to appropriately position the end which serves as the contact arm. The angular position of the conductor determines the pressure exerted at the contact point as it rests upon the conductive surface of plastic gear 3. Maintaining a predetermined pressure between the contact point and the conductor on the gear is crucial to the proper performance of the motor and to the wear of the contacts. In applications where current density is high, a contact button 30 may be suitably attached to the conductor as best viewed in FIG. 2. On the other hand, if current density passing through the contact is low, the contact button may be omitted and the conductor itself will serve as the contact point. In the latter arrangement, the contacting surface of the conductor may be formed in a dished configuration so as to ride smoothly onto and off of the conductive segment of the gear.

While the foregoing description has been directed toward a single conductor and terminal, it is obvious that any number of terminals and contacts could be assembled into a block in the same manner as described. The drawings, in fact, show an assembly employing three conductors. More or less conductors could be used as required to control the desired functions of a device.

The invention has been described with reference to a particular embodiment but will be understood by those skilled in the art that variations and modifications can be effected within the spirit and scope of the invention.

I claim:

1. A contact and terminal assembly which comprises:
   an insulative block member defining an area for the receipt of an electrical conductor and including a block member curved surface;
   a conductor mounted within the area defined by the block member, said conductor having a terminal end and a contact end extending outside the block member;
   a securing member having a securing member curved surface sized to coact with the block member curved surface such that the conductor may be secured therebetween, said surfaces engaging the conductor to bend the conductor such that the contact end of the conductor extends from the block member and extends at an acute angle to the terminal end of the conductor, said surfaces defining the amount of the angle and when secured, said conductor is configured to conform to at least one curved surface; and
   means to affix the securing member to the insulative block to secure the conductor therebetween.

2. The apparatus as set forth in claim 1 wherein the block member further comprises a shoulder and wherein the securing member further comprises a stop section mounted on a resilient finger and wherein the means to affix the securing member to the block member further comprises the securing member stop section engaging the block member shoulder.

3. The apparatus as set forth in claim 2 wherein the conductor further comprises an outwardly extending tab portion which extends to engage the block member shoulder to help secure the conductor in position.

4. The apparatus as set forth in claim 3 wherein the securing member resilient finger defines an angled end surface sized to displace the conductor tab portion from the remainder of the conductor when assembled to promote said tab portion engaging the block member shoulder.

5. The apparatus as set forth in claim 1 and further comprising the terminal end of the conductor extending within the area defined by the block member and the contact end of the conductor extending at an angle to the terminal end, said angle being defined by the coaction of the block member curved surface and the securing member curved surface with the conductor.

6. The apparatus as set forth in claim 5 wherein the block member comprises at least one stop surface and wherein the conductor comprises at least one conductor shoulder, said shoulder being sized to engage the stop surface to limit relative motion between the conductor and the block member.

7. A dynamoelectric machine of the type having an armature and a movable conductive surface defining a plane, said surface being driven by the armature along a predetermined path of travel and comprising:
   a terminal and contact assembly including terminals to which wires may be secured and contacts positioned to engage the conductive surface during at least a portion of the path of travel, said terminal and contact assembly including:
   an insulative block member defining a cavity and a block member curved surface, said block member being angled from the plane of the movable conductive surface;
   a resilient conductor having an end which serves as a terminal and another end which serves as a contact for electrically engaging the conductive surface, said conductor being mounted with the end which serves as a terminal secured within the insulative block member and the end which serves as a contact extending from the block member, and
   a securing member having a securing member curved surface sized to coact with the block member curved surface to secure the conductor therebetween and to configure the conductor such that the end which serves as a contact of the conductor extends from the block member at an acute angle to the end which serves as a terminal and is positioned to engage the conductive surface when the securing member is affixed to the block member.

8. The apparatus as set forth in claim 7 and further comprising said block member defining a shoulder and the securing member further comprising a resilient finger having a stop section, said finger being inserted within the cavity and said stop section engaging the shoulder to affix the securing member to the block member.

9. The apparatus as set forth in claim 8 wherein the conductor further comprises an outwardly extending tab portion which extends to engage the block member shoulder to help secure the conductor in position.

10. The apparatus as set forth in claim 9 wherein the securing member resilient finger defines an angled end surface sized to displace the conductor tab portion from the remainder of the conductor when assembled to promote said tab portion engaging the block member shoulder.

11. The apparatus as set forth in claim 10 and further comprising the terminal end of the conductor extending within the area defined by the block member and the contact end of the conductor extending at an angle to the terminal end, said angle being defined by the coaction of the block member curved surface and the securing member curved surface with the conductor.

12. The apparatus as set forth in claim 11 wherein the block member comprises at least one conductor shoulder, said shoulder being positioned to engage the stop surface to limit relative motion between the conductor and the block member.

13. A method of assembly of a contact and terminal assembly wherein a conductor is secured between a block member having a block member curved surface, a central cavity and a block shoulder, and a securing member which defines a securing member curved surface, an extending resilient finger and a stop section and wherein the conductor defines a tab portion, which comprises the steps of:

placing the conductor within the central cavity of the block member while leaving a portion of the conductor extending therefrom; and inserting the securing member into position to cause bending of the conductor to conform to the block member curved surface and the securing member curved surface, displacing of the conductor tab portion to effect engagement with the block shoulder and affixing of the securing member to the block member by engagement of the stop section with the block shoulder.

14. The method as set forth in claim 13 wherein the block member further includes a stop surface and the conductor further includes a shoulder and wherein the step of placing further comprises abutting the shoulder of the conductor against the stop surface of the block member.

* * * * *